US005753288A

United States Patent [19]

Ogawa

[11] Patent Number: 5,753,288

[45] Date of Patent: May 19, 1998

[54] COATING COMPOSITION FOR A FROZEN DESSERT AND A METHOD FOR COATING THE SAME

[75] Inventor: Makoto Ogawa, Takatsuki, Japan

[73] Assignee: San-Ei Gen F.F.I., Inc., Osaka, Japan

[21] Appl. No.: 618,569

[22] Filed: Mar. 20, 1996

[30] Foreign Application Priority Data

Apr. 3, 1995 [JP] Japan .................................... 7-077757

[51] Int. Cl.$^{6}$ ................................ A23G 9/00; A23L 1/05

[52] U.S. Cl. .......................... 426/100; 426/101; 426/302; 426/573; 426/575; 426/577; 426/578; 426/658

[58] Field of Search .................................... 426/100, 101, 426/573, 575, 577, 578, 658, 302

[56] References Cited

U.S. PATENT DOCUMENTS

| | | | |
|---|---|---|---|
| 2,133,586 | 10/1938 | Stanger et al. | 426/101 |
| 2,191,352 | 2/1940 | Oprean | 426/101 |
| 4,985,263 | 1/1991 | Klug et al. | 426/101 |
| 5,011,704 | 4/1991 | Smagula et al. | 426/100 |
| 5,112,964 | 5/1992 | Aoe et al. . | |
| 5,132,128 | 7/1992 | Rockland | 426/101 |
| 5,256,426 | 10/1993 | Tomioka et al. | 426/100 |
| 5,342,641 | 8/1994 | Masutake et al. | 426/658 |
| 5,468,287 | 11/1995 | Hattori et al. . | |
| 5,501,860 | 3/1996 | Maeda et al. . | |
| 5,556,659 | 9/1996 | De Pedro et al. | 426/100 |

FOREIGN PATENT DOCUMENTS

| | | |
|---|---|---|
| 0607461 | 7/1994 | European Pat. Off. . |
| 2-2317 | 1/1990 | Japan . |

OTHER PUBLICATIONS

European Search Report and Annex for Application No. EP96610013, Oct. 3, 1997.

Patent Abstracts of Japan, vol. 95, No. 7, Aug. 31, 1985, which is a family member of JP 07 102290 A (Sanei), Apr. 18, 1995.

Database WPI, Week 9524, AN 95-183237, XP002042487, Derwent Publications Ltd., London , GB, which is a family member of JP 07 102289 A (Saneigen), Apr. 18, 1995.

"Fiber in Human Nutrition" Edited by Gene A. Spiller and Ronald J. Amen, Plenum Press, pp. 11–13 and 39–44 Oct. 1976.

English Language Abstract of JP–2–2317.

*Primary Examiner*—Steven P. Griffin
*Attorney, Agent, or Firm*—Greenblum & Bernstein P.L.C.

[57] ABSTRACT

A coating composition for a frozen dessert includes water as a medium, a polymer component capable of giving a viscosity, and a water soluble soybean hemicellulose. A method for coating a frozen dessert includes preparing a frozen dessert and immersing the frozen dessert into a coating composition which includes water as a medium, a polymer component capable of giving a viscosity, and water soluble soybean hemicellulose. A dessert includes a frozen dessert coated with a coating composition which includes water as a medium, a polymer component capable of giving a viscosity, and water soluble soybean hemicellulose.

20 Claims, No Drawings

COATING COMPOSITION FOR A FROZEN DESSERT AND A METHOD FOR COATING THE SAME

BACKGROUND OF THE INVENTION

1. Field of the Invention

This invention relates to a coating composition for a frozen dessert and a method for coating a frozen dessert. More particularly, it relates to a coating composition for a frozen dessert using water as a medium in which a polymer component capable of giving a viscosity and a water soluble hemicellulose are contained, and a method for coating the frozen dessert by using the same.

2. Description of the Related Art

A water coating method is known as the simplest method for coating a frozen dessert. In addition, a chocolate coating method, split method and jelly coating method are also known as methods for coating a frozen dessert.

According to the chocolate coating method, a coating composition such as a chocolate containing oil and fat as a main ingredient is heated above its melting point to prepare a coating solution into which a frozen dessert as previously manufactured is immersed for a short period and then is picked out. The chill of the frozen dessert enables the coating composition to be solidified.

The split method is a method for manufacturing a coated frozen dessert by previously preparing an outer shell of the coating solution in an freezing tube used for freezing, filling the tube with a material solution of the frozen dessert, and then freezing it. The outer shell made from the coating solution is prepared by filling the freezing tube with the coating solution, freezing the tube in a brine cooler to freeze the coating solution only in the vicinity of the inner surface of the tube, followed by removing unfrozen coating solution left in the tube by suction.

The jelly coating method is a method for forming an ice film on the surface of a frozen dessert by immersing the frozen dessert in a solution of a gelling agent and immediately picking it up.

However, the conventional methods described above have the following drawbacks. First, the chocolate coating method provides a chocolate coating that does not melt readily in the mouth due to the fact that the addition of oil and fat gives it a high melting point. In addition, a cleave remains in the chocolate coating after it has solidified, thereby lowering its commercial value. Further the flavor of chocolate is so strong that it overwhelms the flavor of the frozen dessert. The split method requires a great deal of work and complex facilities for manufacturing. As for the jelly coating method, the temperature of the gelling agent must be strictly controlled. A slight difference of temperature causes variations in the amount of coating, so that it is difficult to provide a coating with an even thickness. Moreover, the coating according to the jelly coating method easily drops off. When the water coating method is used, the ice formed on the surface of the frozen dessert generates incongruity between the frozen dessert and the coating film.

In order to overcome the problems described above, Japanese Laid-open Patent Publication Hei 2 (1990)-2317 discloses a method for coating by preparing a coating solution of a polymer component capable of giving a viscosity, immersing a frozen dessert therein, and removing it immediately.

However, if a coating solution containing a milk ingredient and acids is used, the milk ingredient is separated, whereby a stable surface film with even thickness is difficult to obtain.

SUMMARY OF THE INVENTION

The present invention provides a coating composition for a frozen dessert which comprises water as medium, a polymer component capable of giving a viscosity and a water soluble hemicellulose, and also use of the coating composition in the manufacturing of a coated frozen dessert.

DETAILED DESCRIPTION OF THE INVENTION

The coating composition for a frozen dessert in accordance with the present invention exhibits a good coating effect, prevents dripping of the coating solution, has easy drying and good texture and keeps its shape for a long time.

The polymer component capable of giving a viscosity (or of thickening) used for the present invention can be at least one selected from the group consisting of xanthan gum, guar gum, tamarind seed gum, pectin, locust bean gum, carrageenan, karaya gum, pullulan, sodium alginate, methylcellulose and sodium carboxymethyl cellulose. Among them, guar gum or tamarind seed gum or their combination are preferably used. The use amount of the polymer component may be suitably adjusted depending on the type of the polymer component, coating amount and operativity in manufacturing. Preferably, it is used in the range from 0.1 to 1.5 wt %, more preferably 0.3 to 1.0 wt % in the coating composition. In particular, guar gum is preferably used at 0.1 to 0.5 wt %, tamarind seed gum is preferably used at 0.1 to 0.5 wt %, or guar gum and tamarind seed gum are preferably used at 0.1 to 0.5 wt % respectively.

The water soluble hemicellulose may be a water soluble hemicellulose derived from a plant as a main component. Examples of water soluble hemicellulose include water soluble dietary fibers derived from a plant such as oil seeds and grains as a material. The oil seeds are generally used in the form of shells of the soybean, palm, coconut, corn, cotton seed and the like, from which oil and fat and protein are removed. The grains are generally used in the form of component of rice, wheat and the like, from which starch powder is removed. Examples of a method for preparing water soluble hemicelulose are as follows. Plants of the above described are used as a material. It is decomposed by heating preferably at temperature from 80° C. to 130° C., more preferably from 100° C. to 130° C. under the acidic or alkaline condition, preferably at pH around an isoelectric point of each protein (generally acidic condition), and a water soluble fraction thereof is taken. Then, water insoluble substances or those having a low molecular weight are removed from the water soluble fraction by treating it with active carbon or by subjecting it to a resin absorption or ethanol precipitation, and the resulting is dried, thereby obtaining desired water soluble hemicellulose.

In the above described method, the decomposition by heating under an acidic or alkaline condition is more preferable than the mere hydrolysis using hot water. Most preferably, it is conducted under an acidic condition at around isoelectric point of the protein in the plant used as the material. This is because protein is hardly dissolved into the decomposed fraction compared with the case of alkaline condition, whereby a following step for removing protein is not necessarily required. In addition, there exhibits a preferable effect of inhibiting a side reaction such as producing lysine or alanine, which is considered to be inappropriate as a food.

The water soluble hemicellulose is mainly composed of a polysaccharide including rhamnose, fucose, arabinose, xylose, galactose, glucose and uronic acid. The average molecular weight of the water soluble hemicellulose measured by the intrinsic viscosity method can be 1,000,000 or less, preferably 300,000 to 600,000. The intrinsic viscosity measures viscosity of the water soluble hemicellulose using a standard pullulan (obtained from HAYASHIBARA Biochemical Laboratories, Inc., Japan) in 0.1M $NaNO_3$. The used amount of the water soluble hemicellulose may be adjusted depending on the type of polymer component, coating amount, operativity in manufacturing and the like. Preferably, it is used in the range from 0.1 to 5.0 wt %, more preferably 0.5 to 3 wt % in the coating composition.

The frozen dessert used for the present invention includes any kind of frozen desserts such as an ice "lolly", ice cream, sherbet and shaved ice.

The coating composition of the present invention optionally contains a solid component. Examples of the solid components can be a milk ingredient, a sweetener, a coloring agent, a flavoring and an emulsifier. The solid component of the coating composition is preferably contained at 2 to 25 wt %, more preferably at 3 to 20 wt % in the coating composition. If the solid component is less than 2 wt %, the coating composition may be formed like a water coated composition and texture incongruity would be sensed, while if it is more than 25 wt %, adhesion of the coating composition to the frozen dessert is increased but the coating composition may be difficult to dry.

Examples of the milk ingredients include milk protein, milk ash content or milk fat, or a combination thereof, which include a non-fat milk component such as concentrated skim milk, non-sugar condensed milk, sweetened condensed milk, skim milk powder and lactose; and a milk fat component such as butter, cream, cheese, butter oil, concentrated whey ice creams, concentrated milk, non-sugar condensed milk, sweetened condensed milk, whole milk powder, cream powder, whey powder, butter milk powder, sweetened milk powder, prepared milk powder, fermentation milk and lactic acid bacteria beverage. As the milk ingredient, those having a low pH value, such as fermented milk, lactic acid beverage, and an acidic milk ingredient in which the pH value is lowered by adding an acid are included. The milk ingredients can be contained at 30 wt % or less, preferably at 2 to 25 wt % in the coating composition provided that the total content of the solid components does not exceed 30 wt %, preferably 25 wt %.

Examples of the sweeteners include a water soluble sweeteners such as sugar and glucose; a liquid sugar of isomerized sugar and the like; and water soluble sweetener having a high sweetness such as dipeptide sweetener, stevioside, thaumatin, chrolodeoxy sugar derivatives, saccharin and the salt thereof. The sweeteners can be contained at 2 to 25 wt % in the coating composition provided that the total content of the solid components does not exceed 25 wt %.

The coloring agent, flavoring and emulsifier may be those generally used in the food industries, and are not specifically limited. Those ingredients can be contained at 2 to 25 wt % in the coating composition provided that the total content of the solid components does not exceed 25 wt %.

The coating composition may be obtained by dissolving the above described polymer component capable of giving a viscosity and water soluble hemicellulose in water while heating to obtain a sol, followed by cooling the resulting solution. The milk ingredient, sweetener, coloring agent and the like may be simultaneously added when the polymer component and water soluble hemicellulose are dissolved in water or after the solution is cooled.

The coating composition can be homogeneously prepared and stably stored by using the above polymer component in combination with the above water soluble hemicellulose.

According to the present invention, a method for coating a frozen dessert using the above described coating composition is provided.

A frozen dessert can be suitably coated by immersing the frozen dessert into the coating composition described above and removing it only once or repeating the process several times. The frozen dessert may be immersed for several seconds, for example 1 to 3 seconds, depending on the condition of the coating composition and desired thickness of the coated film.

The temperature of the coating composition when immersing the frozen dessert can ranges from −5° C. to 20° C., preferably 0° C. to 10° C. When the temperature exceeds 20° C., the frozen dessert will melt during the coating process and will mix with the coating composition, while if the temperature is lower than −5°, the coating composition will be partially frozen and an even coating film can not be formed.

The present invention is further described with reference to the Experiments and Preferred Embodiments as follows.

EXPERIMENT 1

Characteristics of the Coating Solution Caused by the Difference in the Added Amount of Solid Component (Dairy Product)

A coating composition was prepared by adding 0.3 wt % of guar gum(0.3 w/w %), 0.2 wt % of tamarind seed gum and 0.5 wt % of SM-700 (water soluble soybean hemicellulose; SAN-EI GEN F.F.I., INC.) in water and dissolved by heating to 80° C. To the coating composition was added sugar and skim milk as a solid component, and further, 0.3 wt % of citric acid was added. Then, the coating composition was kept at 5° C. A frozen dessert was immersed therein for 2 seconds and picked it up. The coating rate, ease of drying, state of coating and texture were examined and compared.

TABLE 1

| Solid Part (wt %) | Sugar (wt %) | Skim Milk (wt %) | Adhesion (wt %) | Drying easiness | State | Texture |
|---|---|---|---|---|---|---|
| 1 | — | — | 7 | rapid | good | incongruous |
| 5 | 3 | 1 | 10 | rapid | good | congruous |
| 10 | 3 | 6 | 12 | rapid | good | congruous |
| 20 | 3 | 16 | 15 | rather slow | good | congruous |
| 30 | 3 | 26 | 15 | rather slow | good | congruous |

As is seen from the result in Table 1, the more solid component, the more adhesion but the slower the drying. When the solid component was less than 2 wt %, the state was similar to that of a water coated composition, and an incongruous texture resulted. In view of the ease of drying and the state of coating, good coating was obtained when the solid component was from 3 to 20 wt %.

EXPERIMENT 2

Stability Test for the Coating Composition Caused by the Difference in the Added Amount of Water Soluble Soybean Hemicellulose A coating composition was prepared by adding 0.3 wt % of guar gum, 0.2 wt % of tamarind seed gum and 0 to 0.3 wt % of SM-700 (water soluble soybean hemicellulose; SAN-EI GEN F.F.I., INC.) in water and dissolving by heating at 80° C. To the coating composition was added 3 wt % of sugar and 7 wt % of skim milk as a solid component, and further 0.3 wt % of citric acid solution was added. Then, the state of the coating composition was observed.

TABLE 2

| Water soluble soybean hemicellulose (wt %) | State |
|---|---|
| 0 | Separation of milk protein |
| 0.1 | Separation of milk protein |
| 0.3 | Rather bad |
| 0.5 | Good |
| 1 | Good |
| 2 | Good |
| 3 | Good |

As is seen from Table 2, when water soluble hemicellulose was in the range from 0 to 0.3 wt %, the milk ingredient separated. However, when it was in the range from 0.5 to 3 wt %, no separation was observed and a stable coating composition was obtained.

EXPERIMENT 3

Characteristics of the Coating Composition Caused by the Difference in pH Values of the Coating Composition A coating composition was prepared by adding 0.3 wt % of guar gum, 0.2 wt % of tamarind seed gum and 0.5 wt % of SM-700 (water soluble soybean hemicellulose; SAN-EI GEN F.F.I., INC.) in water and dissolved by heating to 80° C. To the coating composition was added 3 wt % of sugar and 6 wt % of skim milk as a solid component, and a citric acid solution was added to adjust the pH from 3 to 7. The resulting was kept at 5° C., and the stability, adhesion and ease of drying were observed.

TABLE 3

| | Stability | Adhesion | Drying easiness |
|---|---|---|---|
| pH 3 | good | good | good |
| pH 4 | good | good | good |
| pH 5 | good | good | good |
| pH 6 | good | good | good |
| pH 7 | good | good | good |

As is seen from Table 3, a stable coating composition was obtained not only under neutral condition but also under acidic condition. Adhesion did not depend on pH.

EXPERIMENT 4

State of Adhesion Caused by the Difference in the Temperature of the Coating Composition A coating composition was prepared by adding 0.3 wt % of guar gum, 0.2 wt % of tamarind seed gum and 0.5 wt % of SM-700 (water soluble soybean hemicellulose; SAN-EI GEN F.F.I., INC.) in water and dissolved by heating to 80° C. To the coating composition was added 3 wt % of sugar and 6 wt % of skim milk as a solid component, and further 0.3 wt % of citric acid. A frozen dessert was immersed in the solution at temperature ranging from 0° C. and 40° C., and picked it up. Then, the adhesion and ease of drying were observed.

TABLE 4

| Temperature (°C.) | Adhesion (wt %) | Drying easiness |
|---|---|---|
| 0 | 14 | rapid |
| 5 | 13 | rapid |
| 10 | 12 | rapid |
| 20 | 10 | rather slow |
| 30 | 7 | rather slow |
| 40 | 6 | slow |

As is seen from the results in Table 4, the higher temperature of the coating composition, the lower the adhesion is. When the temperature exceeds 30° C., the frozen dessert melted when it was immersed and picked up during the coating process and it mixed into the coating composition. In contrast, when the temperature was 0° to 20° C., such phenomena were not observed and good coating was resulted. As for the ease of drying, the results were also good when the temperature was from 0° to 20° C.

| Preferred Embodiment 1 | |
|---|---|
| (Formulation for ice "lolly") | |
| Sweetened condensed milk | 12.25 parts |
| Skim milk | 3.0 |
| Oil and fat | 3.0 |
| Sugar | 8.0 |
| Isomerized sugar | 5.0 |
| SAN NICE YK-500 (Stabilizer) (manufactured by SAN-EI GEN F.F.I., INC.) | 0.2 |
| HOMOGEN No. 994 (Emulsifier) (manufactured by SAN-EI GEN F.F.I., INC.) | 0.1 |
| Flavor | 0.1 |
| | Balanced with water to 100 parts |

A mixture comprising 12.25 parts of sweetened condensed milk, 3 parts of oil and fat and 5 parts of isomerized sugar was added to water and dissolved by stirring at 70° C. To this, 3 parts of skim milk, 8 parts of sugar, 0.2 part of SAN NICE YK-500 and 0.1 part of HOMOGEN No. 994 were added and stirred for 10 minutes at 80° C., and homogenized at 150 kg/cm$^2$. After cooling it to 5° C., aging was conducted. Then, flavor was added and mixed well, and the solution was poured into a freezing tube. It was then immersed in a brine cooler at −40° C. to freeze the solution.

| (Preparation of the coating composition) | |
|---|---|
| Formulation | |
| Sugar | 3.0 parts |
| Skim milk | 6.0 |
| SAN SWEET 100S (Sweetener) (manufactured by SAN-EI GEN F.F.I., INC.) | 0.1 |
| Guar gum | 0.2 |
| Tamarind seed gum | 0.3 |
| Water soluble soybean hemicellulose | 0.5 |
| Citric acid | 0.3 |
| Colorant | 0.2 |
| Flavor | 0.1 |
| | Balanced with water to 100 parts |

A mixture comprising 3.0 parts of sugar, 6.0 parts skim milk, 0.1 part of SAN SWEET 100S, parts of guar gum, 0.2 part of tamarind seed gum, 0.5 part of water soluble soybean hemicellulose was added to water and dissolved by stirring for 10 minutes at 80° C. To this, 0.3 part of citric acid and 0.2 part of colorant and 0.2 part of flavor were added.

(Coating method)

The obtained ice lolly (having a temperature of about −30° C.) was immersed into the coating composition for 2 seconds, and picked up immediately. This process was repeated 2 times, thereby giving a coated ice "lolly". The coated ice "lolly" was evenly coated with a film containing a milk ingredient.

According to the coating composition of the present invention, coating can be provided evenly with easy drying, low cost, good adhesion and a coating surface that exhibits little peeling. The present invention also prevents from the coating solution from dripping and from cleaving. The present invention can provide a variety of coatings by adding different flavors and colors. Moreover, a coating that retains it shape for a long time and with a good flavor release can be created. Even when a solid component such as a milk ingredient, sweetener, colorant, flavor, emulsifier and the like is added, the coating solution does not separate and the coating composition can be used stably.

A coated frozen dessert which will melt pleasantly in the mouth, have good adhesion, and a coating that will dry easily can be made easily by coating the frozen dessert with the coating composition of the present invention.

What I claim is:

1. A coating composition for a frozen dessert, comprising:

water as a medium;

a polymer component capable of giving a viscosity; and a water soluble soybean hemicellulose.

2. The coating composition for a frozen dessert of claim 1, wherein, at a temperature of −5° C., the coating composition is partially frozen.

3. The coating composition for a frozen dessert of claim 1, wherein the polymer component is at least one member selected from the group consisting of xanthan gum, guar gum, tamarind seed gum, pectin, locust bean gum, carrageenan, karaya gum, pullulan, methylcellulose, and sodium carboxymethyl cellulose.

4. The coating composition for a frozen dessert of claim 3, wherein the polymer component comprises 0.1 to 1.5 wt % of the coating composition.

5. The coating composition for a frozen dessert of claim 3, wherein the polymer component is selected from the group consisting of 0.1 to 0.5 wt % of guar gum, 0.1 to 0.5 wt % of tamarind seed gum, and both 0.1 to 0.5 wt % of guar gum and 0.1 to 0.5 wt % of tamarind seed gum.

6. The coating composition for a frozen dessert of claim 1, wherein the water soluble soybean hemicellulose comprises 0.1 to 5 wt % of the coating composition.

7. The coating composition for a frozen dessert of claim 1, wherein the frozen dessert is selected from the group consisting of an ice lolly, ice cream, sherbet, and shaved ice.

8. The coating composition for a frozen dessert of claim 1, further comprising a solid component.

9. The coating composition for a frozen dessert of claim 8, wherein the solid component is at least one member selected from the group consisting of a milk ingredient, a sweetener, a coloring agent, a flavoring, and an emulsifier.

10. The coating composition for a frozen dessert of claim 9, wherein the solid component comprises the milk ingredient, and wherein the milk ingredient is selected from the group consisting of milk protein, milk ash content, and milk fat.

11. The coating composition for a frozen dessert of claim 9, wherein the solid component comprises the milk ingredient, and wherein the milk ingredient comprises 30 wt % or less of the coating composition.

12. The coating composition of claim 9, wherein the solid component comprises the sweetener, and wherein the sweetener is selected from the group consisting of water soluble sweetener and liquid sugar.

13. The coating composition of claim 12, wherein the sweetener comprises water soluble sweetener, and wherein the water soluble sweetener has high sweetness.

14. The coating composition of claim 12, wherein the sweetener comprises from 2 wt % to 25 wt % of the coating composition.

15. A frozen dessert coated with the coating composition according to claim 1.

16. A dessert, comprising:

a frozen dessert; and a coating including water as a medium, a polymer component capable of giving a viscosity, and a water soluble soybean hemicellulose.

17. The dessert of claim 16, wherein, at a temperature of −5° C., the coating is partially frozen.

18. The dessert of claim 16, wherein the frozen dessert is selected from the group consisting of an ice lolly, ice cream, sherbet, and shaved ice.

19. A method for coating a frozen dessert, comprising:

preparing a frozen dessert;

immersing the frozen dessert into a coating composition which includes water as a medium, a polymer component capable of giving a viscosity, and water soluble soybean hemicellulose, so as to coat the frozen dessert; and removing the coated frozen dessert from the coating composition.

20. The method of claim 19, wherein a temperature of the coating composition is maintained in a range from −5° C. to 20° C.

* * * * *